United States Patent
Huang et al.

(10) Patent No.: US 12,088,204 B2
(45) Date of Patent: Sep. 10, 2024

(54) POWER SUPPLY CIRCUIT

(71) Applicant: Honor Device Co., Ltd., Shenzhen (CN)

(72) Inventors: Ting Huang, Shenzhen (CN); Chen Zhu, Shenzhen (CN); Yingqun Feng, Shenzhen (CN); Yupeng Qiu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 192 days.

(21) Appl. No.: 17/777,817

(22) PCT Filed: Apr. 28, 2021

(86) PCT No.: PCT/CN2021/090677
§ 371 (c)(1),
(2) Date: May 18, 2022

(87) PCT Pub. No.: WO2021/219027
PCT Pub. Date: Nov. 4, 2021

(65) Prior Publication Data
US 2022/0416662 A1    Dec. 29, 2022

(30) Foreign Application Priority Data

Apr. 29, 2020  (CN) .......................... 202010356259.5

(51) Int. Cl.
   *H02M 3/158*    (2006.01)
(52) U.S. Cl.
   CPC ................. *H02M 3/1582* (2013.01)

(58) Field of Classification Search
   CPC .... H02M 3/1582; H02M 3/158; H02M 3/157; H02M 3/156; H02M 3/1566; H02M 3/155
   See application file for complete search history.

(56) References Cited

U.S. PATENT DOCUMENTS

| 5,773,963 A | 6/1998 | Blanc et al. |
| 6,081,673 A | 6/2000 | Okubo |

(Continued)

FOREIGN PATENT DOCUMENTS

| CN | 201985759 U | 9/2011 |
| CN | 102751872 A | 10/2012 |

(Continued)

OTHER PUBLICATIONS

Intersil, "High Efficiency Buck-Boost Regulator with 4.5A Switches," XP093125620, Jun. 23, 2013, 10 pages.

(Continued)

*Primary Examiner* — Nguyen Tran
(74) *Attorney, Agent, or Firm* — Conley Rose, P.C.

(57) ABSTRACT

A power supply circuit and a control method for a control circuit, where the control circuit is coupled to the voltage buck-boost adjustment circuit. The control circuit is configured to: when a voltage value of a first enable signal of the voltage buck-boost adjustment circuit is greater than or equal to a first predetermined value, control the output voltage of the voltage buck-boost adjustment circuit to be a first output voltage, and is further configured to: when the voltage value of the first enable signal of the voltage buck-boost adjustment circuit is less than or equal to a second predetermined value, control the output voltage of the voltage buck-boost adjustment circuit to be a second output voltage or a zero voltage.

20 Claims, 5 Drawing Sheets

(56) References Cited

U.S. PATENT DOCUMENTS

| | | |
|---|---|---|
| 6,343,026 B1 | 1/2002 | Perry |
| 6,969,977 B1 | 11/2005 | Smith |
| 8,358,117 B1 | 1/2013 | Chui et al. |
| 8,907,646 B2 | 12/2014 | Lee |
| 9,490,661 B2 | 11/2016 | Kabasawa et al. |
| 9,660,516 B2 | 5/2017 | Fogg |
| 10,069,412 B2 | 9/2018 | Lee et al. |
| 10,594,218 B1 | 3/2020 | Zhan et al. |
| 10,948,971 B2 | 3/2021 | Gofman |
| 10,965,212 B2 | 3/2021 | Arno |
| 2004/0051509 A1 | 3/2004 | Matsuo et al. |
| 2004/0119341 A1 | 6/2004 | Hickle |
| 2005/0185352 A1 | 8/2005 | Nguyen |
| 2008/0067987 A1 | 3/2008 | Tung et al. |
| 2010/0066331 A1 | 3/2010 | Chang et al. |
| 2012/0153917 A1 | 6/2012 | Adell |
| 2013/0009470 A1 | 1/2013 | Chuang et al. |
| 2014/0057575 A1* | 2/2014 | Ayukawa ............ G05F 1/10 455/73 |
| 2014/0125127 A1 | 5/2014 | Chou et al. |
| 2014/0176978 A1 | 6/2014 | Shigetomi |
| 2014/0203791 A1 | 7/2014 | Lee et al. |
| 2014/0268890 A1 | 9/2014 | Xie et al. |
| 2015/0156846 A1 | 6/2015 | Cao |
| 2015/0200592 A1 | 7/2015 | Chang |
| 2015/0381048 A1* | 12/2015 | Kim ............ H02M 3/158 323/271 |
| 2018/0367029 A1 | 12/2018 | Maruyama |
| 2019/0319540 A1 | 10/2019 | Arno et al. |
| 2019/0363635 A1 | 11/2019 | Lin et al. |
| 2022/0224219 A1* | 7/2022 | Xie ............ H02M 3/07 |

FOREIGN PATENT DOCUMENTS

| | | |
|---|---|---|
| CN | 202978699 U | 6/2013 |
| CN | 103606884 A | 2/2014 |
| CN | 103809639 A | 5/2014 |
| CN | 104540293 A | 4/2015 |
| CN | 105356750 A | 2/2016 |
| CN | 106130346 A | 11/2016 |
| CN | 108233711 A | 6/2018 |
| CN | 210093111 U | 2/2020 |
| CN | 110881158 A | 3/2020 |
| CN | 111614254 A | 9/2020 |
| EP | 2750262 A1 | 7/2014 |
| JP | 2005035062 A | 2/2005 |
| JP | 2019170073 A | 10/2019 |
| WO | 2017207713 A1 | 12/2017 |

OTHER PUBLICATIONS

Maxim Integrated, "MAX77813-High-Efficiency Buck—Boost Converter," XP093125621, Oct. 1, 2018, 29 pages.
Analog Devices, "LTC3780-High Efficiency, Synchronous, 4-Switch Buck-Boost Controller," XP093125623, Feb. 1, 2019, 30 pages.
Texas Instruments, "TPS6300x High-Efficient Single Inductor Buck-Boost Converter With 1.8-A Switches," XP093125730, Mar. 1, 2006, 26 pages.
Texas Instruments, "TPS631000 1.5-A Output Current, High Power Density Buck-Boost Converter," XP093125748, Oct. 1, 2021, 27 pages.

* cited by examiner

POWER SUPPLY CIRCUIT

CROSS-REFERENCE TO RELATED APPLICATIONS

This application is a U.S. National Stage of International Application No. PCT/CN2021/090677 filed on Apr. 28, 2021, which claims priority to Chinese Patent Application No. 202010356259.5, filed with the China National Intellectual Property Administration on Apr. 29, 2020, both of which are incorporated herein by reference in their entireties.

This application claims priority to Chinese Patent Application No. 202010356259.5, filed with the China National Intellectual Property Administration on Apr. 29, 2020 and entitled "POWER SUPPLY CIRCUIT", which is incorporated herein by reference in its entirety.

TECHNICAL FIELD

One or more embodiments of this application generally relate to the field of power supply circuits of electronic devices, and in particular, to a voltage-adjustable power supply circuit.

BACKGROUND

Currently, voltage buck-boost converters (buck-boost converter, Buck-Boost Converter) have been widely included in power supply circuits of existing electronic devices (mobile phones, tablets, TVs, PCs, speakers, watches, and the like). In short, a voltage buck-boost converter is configured to provide a stable output voltage to an electronic device. Generally, to ensure normal operation of the electronic device while reducing energy consumption of an electronic device, an output voltage of the voltage buck-boost converter is generally not set to be relatively high. Therefore, in the electronic device, a boost (Boost) circuit needs to be additionally provided for a module that uses a relatively high voltage power supply. As a result, a circuit area is occupied, and manufacturing costs are increased.

SUMMARY

Some implementations of this application provide a power supply circuit. The application is described from the following aspects, and the implementations and beneficial effects of the following aspects can be referred to each other.

According to a first aspect, an implementation of this application provides a power supply circuit, where the power supply circuit includes a voltage buck-boost adjustment circuit and a control circuit. The voltage buck-boost adjustment circuit may be switched between a boost (boost) mode and a buck (buck) mode, so as to increase or decrease an input voltage to obtain a required output voltage. The control circuit is coupled to the voltage buck-boost adjustment circuit. The control circuit is configured to control an output voltage of the voltage buck-boost adjustment circuit to switch between a first output voltage and a second output voltage, where the first output voltage is higher than the second output voltage, the first output voltage may drive a module that needs to be driven by a high voltage, and the second output voltage may drive another module that does not need to be driven by a high voltage. Specifically, when a voltage value of a first enable signal of the voltage buck-boost adjustment circuit is greater than or equal to a first predetermined value, the control circuit controls the output voltage of the voltage buck-boost adjustment circuit to be the first output voltage; and when the voltage value of the first enable signal of the voltage buck-boost adjustment circuit is less than or equal to a second predetermined value, the control circuit controls the output voltage of the voltage buck-boost adjustment circuit to be the second output voltage or a zero voltage, where the first predetermined value is greater than the second predetermined value.

It may be learned from the foregoing implementation of the first aspect that the power supply circuit in this implementation of this application may provide a high output voltage and a low output voltage. Therefore, a boost circuit in the existing technology is omitted. In the existing technology, a boost (Boost) circuit needs to be additionally provided in an electronic device for a module that uses a relatively high voltage power supply. However, a circuit structure of the boost circuit is relatively complex and a relatively large quantity of devices are used in the circuit. Therefore, in the existing technology, a circuit area is occupied, manufacturing costs are increased, and a higher integration requirement cannot be met. In the power supply circuit in this implementation of this application, when no additional boost circuit is needed, an input voltage required for operation may also be provided to a module that needs to be driven by a high voltage, such as an NFC module, so that a circuit area occupied by the boost circuit may be released for the electronic device.

With reference to the first aspect, in some implementations, the control circuit includes a first switch circuit and a first resistor, where the first switch circuit is coupled to the first resistor; and the first switch circuit may be turned on when a voltage value of a first enable signal is greater than or equal to a first predetermined value, or turned off when the voltage value of the first enable signal is less than or equal to a second predetermined value.

With reference to the first aspect, in some implementations, the power supply circuit further includes a feedback voltage adjustment circuit and a feedback voltage port that are of the voltage buck-boost adjustment circuit, and the feedback voltage adjustment circuit is configured to adjust an output voltage of the voltage buck-boost adjustment circuit based on a feedback voltage output by the feedback voltage port. The first resistor is coupled to the feedback voltage adjustment circuit by using the first switch circuit. When the first switch circuit is turned on, the coupling between the first resistor of the control circuit and the feedback voltage adjustment circuit is enabled; or when the first switch circuit is turned off, the coupling between the first resistor and the feedback voltage adjustment circuit is disabled.

With reference to the first aspect, in some implementations, the first resistor of the control circuit may be configured to increase a total current of the feedback voltage adjustment circuit when the voltage value of the first enable signal is greater than or equal to the first predetermined value.

It may be learned from the foregoing implementation of the first aspect that, by increasing the total current of the feedback voltage adjustment circuit, the control circuit adjusts the output voltage of the voltage buck-boost adjustment circuit to a high voltage, so as to provide an input voltage required for operation for a module that needs to be driven by a high voltage, such as an NFC module.

With reference to the first aspect, in some implementations, the first switch circuit may include three ports, where a first port of the first switch circuit receives the first enable signal, a second port is coupled to one end of the feedback voltage adjustment circuit and is grounded, a third port is coupled to one end of the first resistor, and the other end of the first resistor is coupled to the feedback voltage port.

With reference to the first aspect, in some implementations, the power supply circuit further includes a second switch circuit. The second switch circuit may be configured to: when the voltage value of the first enable signal is greater than the voltage value of the second enable signal of the voltage buck-boost adjustment circuit, turn on an input of the first enable signal to an enable port of the buck-boost adjustment circuit; and when the voltage value of the first enable signal is less than the voltage value of the second enable signal, turn off the input of the second enable signal to the control circuit. The power supply circuit further includes a third switch circuit, configured to: when the voltage value of the second enable signal of the voltage buck-boost adjustment circuit is greater than the voltage value of the first enable signal, turn on the input of the second enable signal to the enable port of the buck-boost adjustment circuit; and when the voltage value of the second enable signal is less than the voltage value of the first enable signal, turn off the input of the first enable signal input to a generation module of the second enable signal.

The generation module of the second enable signal may be a battery module and/or a power management unit or a power management circuit (Power Management Unit or Power Management Integrated Circuit, PMU or PMIC for short), and the battery module and the PMU may provide a same or different enable signals to the enable port (EN).

With reference to the first aspect, in some implementations, the control circuit is further configured to: when the voltage value of the first enable signal is less than or equal to the second predetermined value and the second enable signal of the voltage buck-boost adjustment circuit is greater than zero, control the output voltage of the voltage buck-boost adjustment circuit to be the second output voltage.

With reference to the first aspect, in some implementations, when the voltage value of the first enable signal is less than or equal to the second predetermined value and the second enable signal of the voltage buck-boost adjustment circuit is equal to zero, the output voltage of the voltage buck-boost adjustment circuit is a zero voltage.

With reference to the first aspect, in some implementations, the feedback voltage adjustment circuit may include a second resistor and a third resistor, where one end of the second resistor is coupled to the second port of the first switch circuit and is grounded, the other end of the second resistor is coupled to one end of the third resistor, and is coupled to the feedback voltage port, and the other end of the third resistor is coupled to the output port of the output voltage of the voltage buck-boost adjustment circuit.

With reference to the first aspect, in some implementations, the first switch circuit is a transistor.

With reference to the first aspect, in some implementations, the first switch circuit includes an insulated field effect transistor.

With reference to the first aspect, in some implementations, the second switch circuit is a diode, a positive electrode of the second switch circuit receives the first enable signal, and a negative electrode of the second switch circuit is coupled to an enable port; and the third switch circuit is a diode, a positive electrode of the third switch circuit receives the second enable signal, and a negative electrode of the third switch circuit is coupled to the enable port.

With reference to the first aspect, in some implementations, the first enable signal is a voltage signal from an NFC module.

With reference to the first aspect, in some implementations, the second enable signal is a voltage signal from a power management unit.

With reference to the first aspect, in some implementations, the signal of the first output voltage and/or the signal of the second output voltage are/is used to drive the NFC module.

According to a second aspect, an implementation of this application provides a method or controlling a control circuit of a voltage buck-boost adjustment circuit. The control method may enable an output voltage of the voltage buck-boost adjustment circuit to be a first output voltage and a second output voltage, where the first output voltage is higher than a second output voltage. The method includes: when a voltage value of a first enable signal of the voltage buck-boost adjustment circuit is greater than or equal to a first predetermined value, controlling an output voltage of the voltage buck-boost adjustment circuit to be the first output voltage; and when the voltage value of the first enable signal of the voltage buck-boost adjustment circuit is less than or equal to a second predetermined value, controlling the output voltage of the control voltage buck-boost adjustment circuit to be the second output voltage or a zero voltage, where the first predetermined value is greater than the second predetermined value.

It may be learned from the foregoing implementation of the second aspect that the power supply circuit in the implementation of this application may provide high and low output voltages. Therefore, a boost circuit in the existing technology is omitted. In the existing technology, a boost (Boost) circuit needs to be additionally provided in an electronic device for a module that uses a relatively high voltage power supply. However, a circuit structure of the boost circuit is relatively complex and a relatively large quantity of devices are used in the circuit. Therefore, in the existing technology, a circuit area is occupied, manufacturing costs are increased, and a higher integration requirement cannot be met. In the power supply circuit in this implementation of this application, when no additional boost circuit is needed, an input voltage required for operation may also be provided to a module that needs to be driven by a high voltage, such as an NFC module, so that a circuit area occupied by the boost circuit may be released for the electronic device.

With reference to the second aspect, in some implementations, the control circuit is configured to: when the voltage value of the first enable signal is less than or equal to the second predetermined value and a voltage value of a second enable signal of the voltage buck-boost adjustment circuit is greater than zero, control the output voltage of the voltage buck-boost adjustment circuit to be the second output voltage.

With reference to the first aspect, in some implementations, the control circuit is configured to: when the voltage value of the first enable signal is less than or equal to the second predetermined value and a voltage value of the second enable signal of the voltage buck-boost adjustment circuit is greater than zero, control the output voltage of the voltage buck-boost adjustment circuit to be a zero voltage.

With reference to the second aspect, in some implementations, the first enable signal is a voltage signal from an NFC module.

With reference to the second aspect, in some implementations, the second enable signal is a voltage signal from a power management unit.

With reference to the second aspect, in some implementations, the signal of the first output voltage and/or the signal of the second output voltage are/is used to drive the NFC module.

BRIEF DESCRIPTION OF DRAWINGS

FIG. 1B is a simplified schematic circuit diagram of a power supply circuit of a voltage buck-boost converter shown in FIG. 1a;

FIG. 4 is a schematic diagram illustrating an output voltage change of a power supply circuit according to this application when an electronic device is powered on.

DESCRIPTION OF EMBODIMENTS

This application is further described in detail below with reference to specific embodiments and accompanying drawings. It may be understood that the specific embodiments described herein are merely intended to explain this application, but are not intended to limit this application. In addition, for ease of description, the accompanying drawings only illustrate a part of the structure related to this application instead of all of the structure or process.

The following specific embodiments illustrate the implementations of this application, and those skilled in the art can easily understand other advantages and effects of this application from the contents disclosed in this specification. Although the description of this application is described with reference to preferred embodiments, it does not mean that features of this invention are limited to this implementation. On the contrary, the purpose of describing the invention with reference to implementations is to cover other options or modifications that may be extended based on the claims of this application. To provide a deep understanding of this application, many specific details are included in the following description. This application may also be practiced without these details. In addition, to avoid confusing or obscuring key points of this application, some specific details are omitted in the description. It should be noted that the embodiments of this application and the features in the embodiments may be combined with each other provided that no conflict occurs.

It should be noted that, in this specification, similar reference numerals and letters indicate similar terms in the following accompanying drawings. Therefore, once a certain term is defined in one accompanying drawing, it does not need to be further defined and explained in the subsequent accompanying drawings.

As used herein, the term "module or unit" may refer to or include an application-specific integrated circuit (ASIC), an electronic circuit, a processor (shared, dedicated or group) and/or a memory (shared, dedicated or group) that executes one or more software or firmware programs, a combinational logic circuit, and/or other suitable components that provide the described functions, or may be part of the application-specific integrated circuit (ASIC), the electronic circuit, the processor (shared, dedicated or group) and/or the memory (shared, dedicated or group) that executes one or more software or firmware programs, the combinational logic circuit, and/or other suitable components that provide the described functions.

To make the objectives, technical solutions, and advantages of this application clearer, the following further describes embodiments of this application in detail with reference to the accompanying drawings.

Figure 1A:
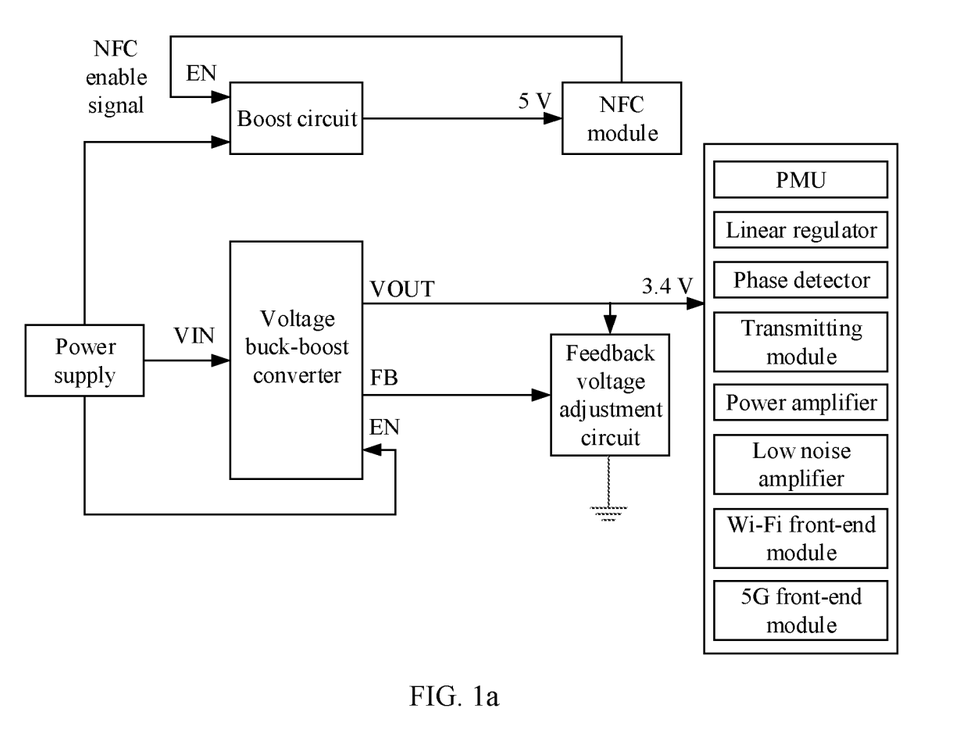
FIG. 1a is a simplified module diagram of a part of a power supply circuit of an electronic device in the existing technology.
Figure 1B:
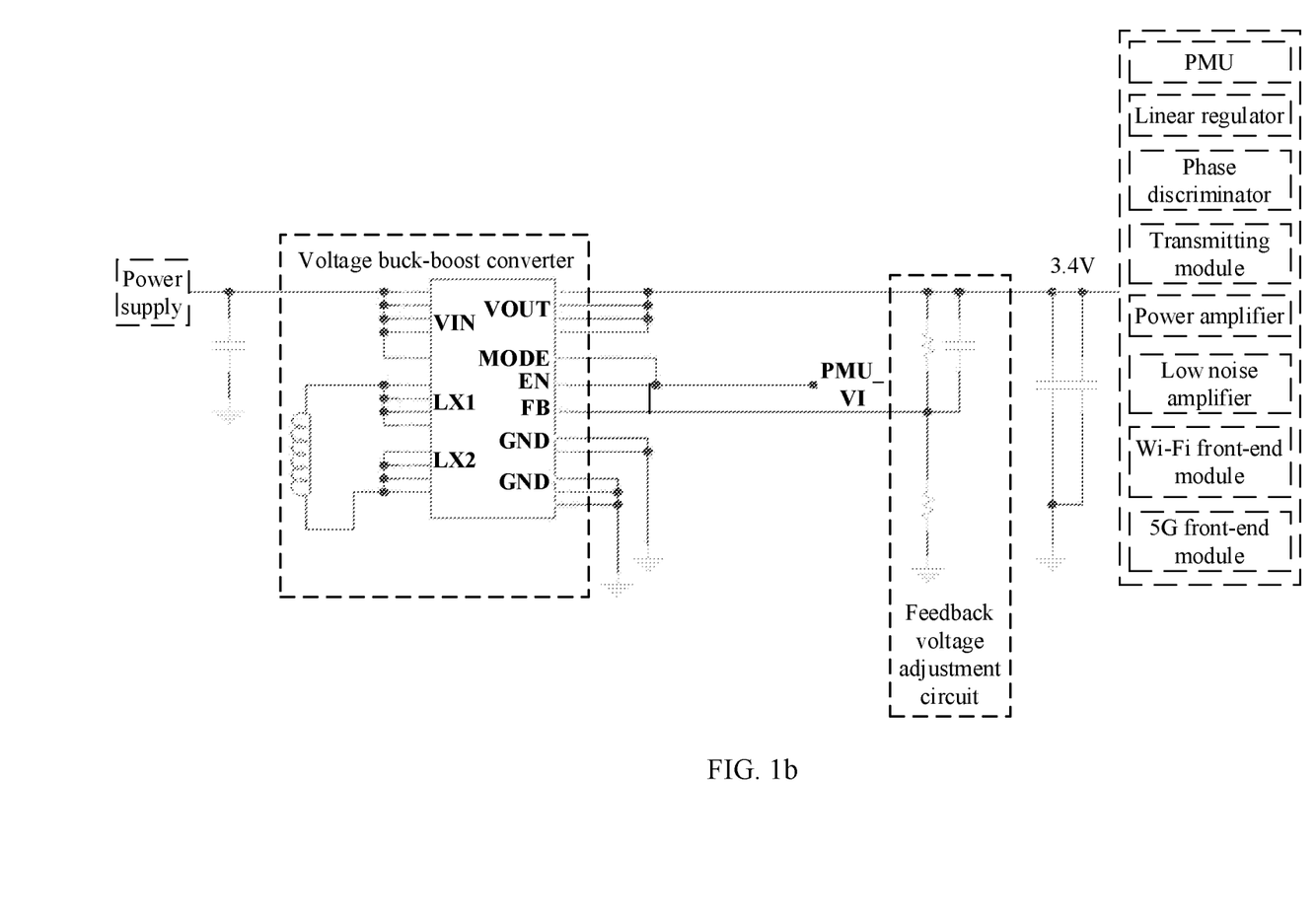

FIG. 1a is a simplified module diagram of some modules of an electronic device in the existing technology. As shown in FIG. 1a, a power supply supplies power to both a voltage buck-boost converter (Buck-Boost Converter) and a boost (Boost) circuit. FIG. 1B is a simplified schematic circuit diagram of a power supply circuit of a voltage buck-boost converter shown in FIG. 1a.

As shown in FIG. 1B, when an electronic device operates, a power supply provides an input voltage to the voltage buck-boost converter. The input voltage of the power supply generally ranges from 3.4 V to 4.4 V. However, the input voltage may fluctuate significantly. For example, when the electronic device operates at a high power, the input voltage provided by the power supply falls seriously, for example, falls to about 2.8-2.9 V. In this case, the voltage buck-boost converter may also provide a stable output voltage. In some examples, a voltage output end VOUT of the voltage buck-boost converter may be set to generate a fixed output voltage that is not adjustable. In some other examples, optionally, the feedback voltage adjustment circuit may be coupled between the voltage output end of the voltage buck-boost converter and a feedback voltage output end of the voltage buck-boost converter, so that the voltage buck-boost converter may correspondingly output different output voltages based on different configurations of the feedback voltage adjustment circuit. Generally, the voltage buck-boost converter supplies power to many modules of the electronic device. Therefore, to ensure normal operation of the electronic device while reducing energy consumption of the electronic device, in the example shown in FIG. 1, an output voltage of the voltage buck-boost converter may be set to about 3.4 V. The voltage may be used to drive various modules of the electronic device, such as a power management unit or a power management circuit (Power Management Unit or Power Management Integrated Circuit, PMU or PMIC for short), a linear regulator, a phase detector, a transmitting module, a power amplifier, a low noise amplifier, a Wi-Fi front-end module, and a 5G front-end module.

It may be understood that the output voltage value of 3.4 V is merely used as an example. By configuring the feedback voltage adjustment circuit, the output voltage may be another voltage value allowed in the design specification of the voltage buck-boost converter, which is not limited in this application.

However, for one or more other modules of the electronic device, they need to be driven by using a high voltage higher than 3.4 V in some scenarios or a specific scenario. If the modules are directly powered by using a power supply or a voltage buck-boost converter, some or all functions cannot be implemented by the modules. The modules may include, for example, the NFC module shown in FIG. 1a. The NFC module may implement near field communication (Near Field Communication). This technology is also referred to as short-range wireless communication, and is a short-range high-frequency wireless communication technology that allows electronic devices to exchange data for contactless point-to-point data transmission at a distance (for example, within 10 centimeters). The NFC technology provides a highly convenient communication manner for all consumer electronic products, making the electronic devices become secure, convenient, and fast contactless payment and ticketing tools. It may be understood that the NFC module is only an example of a module that needs to be driven by a high voltage in some cases, and is not a specific limitation.

For the NFC module, when wireless communication is performed, an antenna of the NFC module needs to be powered by using a high voltage, so as to send and/or receive an NFC radio frequency signal. Generally, as shown in FIG. 1a, a high voltage such as about 5 V may be used to supply power to the NFC module.

The voltage buck-boost converter generally does not provide a voltage of 5 V. Therefore, to drive the NFC module, as shown in FIG. 1a, a boost circuit that can provide a high output voltage may be coupled between a power supply and a voltage input end of the NFC module. A voltage input end of the boost circuit is coupled to a power supply. An enable port (EN) of the boost circuit is coupled to the NFC module, and is configured to receive an NFC enable signal from the NFC module. A voltage output end of the boost circuit is coupled to the voltage input end of the NFC module. Generally, an enable port (EN) is a control signal input end, and is also referred to as an enable port (Enable). The enable port may be an input pin of a chip or an input port of a circuit. The chip or circuit can operate only when the pin is activated. Generally, the enable port is valid at a high level.

When the NFC module needs to operate, the NFC module outputs an NFC enable signal. The NFC enable signal may use a high level such as 1.8 V, and be input to the enable port of the boost circuit, so that the boost circuit operates and outputs a high voltage after boosting the voltage from the power supply, so as to provide the NFC module with an operating voltage such as 5 V required for the NFC module to operate. When the NFC module does not operate, the NFC enable signal is at a low level such as 0 V, and in this case, the boost circuit is not enabled and does not provide a voltage to the NFC module.

A possible disadvantage in the existing technology shown in FIG. 1a is that a boost (Boost) circuit needs to be additionally provided in an electronic device for a module that uses a relatively high voltage power supply. Because a circuit structure of the boost circuit is relatively complex and a relatively large quantity of components are used in the circuit, a circuit area is occupied in the existing solution, and manufacturing costs are increased. Currently, a higher integration level of an electronic device is required by a 5G technology. Apparently, an existing solution cannot meet a higher integration requirement.

As described below, in this application, circuit design of the existing solution is improved to resolve the foregoing or other related technical problems.

Figure 2:
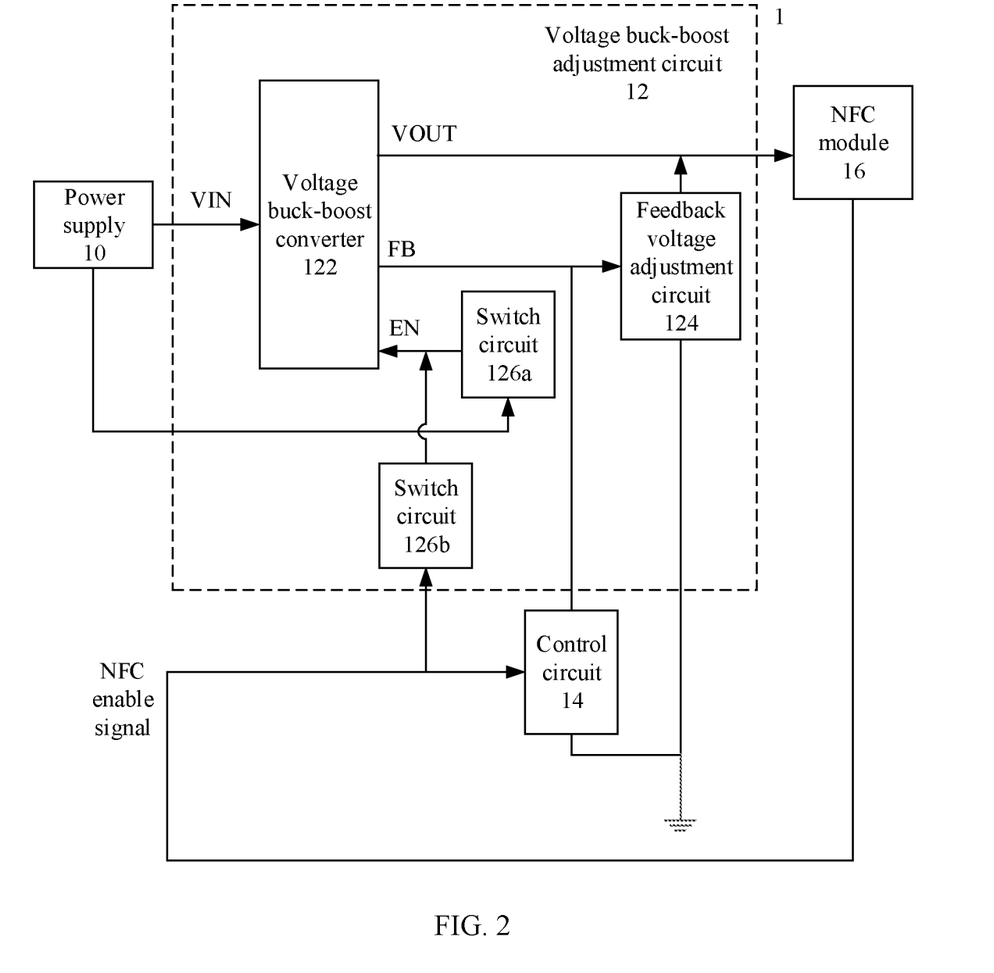
FIG. 2 is a simplified schematic module diagram of a part of a power supply circuit of an electronic device according to an example implementation of this application.

FIG. 2 is a simplified schematic module diagram of a part of a power supply circuit of an electronic device 1 according to an implementation of this application. The example electronic device 1 includes, but is not limited to, a laptop device, a desktop computer, a handheld PC, a personal digital assistant, an embedded processor, a digital signal processor (digital signal processor, DSP for short), a video game device, a set-top box, a microcontroller, a cellular phone, a portable media player, a handheld device, a wearable device (for example, display glasses or goggles, a head-mounted display (head-mounted display, HMD for short), a watch, a head-mounted device, an armband or jewelry), virtual reality (virtual reality, VR for short) and/or augmented reality (augment reality, AR for short) devices, an Internet of Things (Internet of Things, IoT) device, a smart audio system, a streaming media client device, an e-book reading device, and various other electronic devices.

As shown in FIG. 2, the electronic device 1 may include a power supply 10, a voltage buck-boost adjustment circuit 12, a control circuit 14, and an NFC module 16. The power supply 10 may include but is not limited to at least one of a battery module or a power supply module such as a power management unit or a power management circuit. The power supply 10 may provide one or more supply voltages, and the supply voltage is used to supply power to another electronic component of the electronic device 1. In the illustrated implementation, that the power supply 10 supplies power to the voltage buck-boost adjustment circuit 12 is only used as an example.

The voltage buck-boost adjustment circuit 12 may include a voltage buck-boost converter 122, a feedback voltage adjustment circuit 124, a switch circuit 126a, and a switch circuit 126b. A letter following a reference number, such as "126a", indicates a reference to an element with the specific reference number. A reference number without a subsequent letter in the text, such as "126", indicates a general reference to the implementation of an element with the reference number.

An input port (VIN) of the voltage buck-boost converter 122 is coupled to the power supply 10, and the input port (VIN) may also be considered as an input port of the voltage buck-boost adjustment circuit 12, that is, an input port n (VIN) of the voltage buck-boost adjustment circuit 12. This is not emphasized below. An enable port (EN) of the voltage buck-boost converter 122 is coupled to the NFC module by using the switch circuit 126b, and is configured to receive an NFC enable signal from the NFC module, and is coupled to the power supply 10 by using the switch circuit 126a. In one or more optional examples, the power supply 10 that provides an input voltage to the enable port (EN) may be a battery module and/or a PMU. Voltages provided by the battery module and the PMU to the enable port (EN) for enabling the voltage buck-boost converter 122 may be the same or different. For example, in some cases, the battery module may be selected to provide an input voltage such as 3.6 V to the enable port (EN); and in some other cases, the PMU may be selected to provide an input voltage such as 1.8 V to the enable port (EN). This is not limited in this application. In the implementation described below, the power supply 10 includes a battery module and a PMU; and after the electronic device 1 is powered on, the PMU may be used to provide an input voltage, that is, a PMU enable signal, to the enable port (EN), and the PMU enable signal may be used to enable the voltage buck-boost converter 122 after the electronic device 1 is powered on. In addition, the battery module may provide an input voltage to the input port (VIN) of the voltage buck-boost converter 122 when the electronic device 1 is powered on or powered off.

A voltage output port (VOUT) and a feedback voltage output port (FB) of the voltage buck-boost converter 122 are separately coupled to a feedback voltage adjustment circuit 124. The voltage output port (VOUT) of the voltage buck-boost converter 122 may also be considered as an output port of the voltage buck-boost adjustment circuit 12, that is, a voltage output port (VOUT) of the voltage buck-boost adjustment circuit 12. This is not emphasized below. Similar to the voltage buck-boost converter shown in FIG. 1a, the voltage buck-boost converter 122 is configured to switch, based at least in part on an input voltage provided by the power supply 10, between a boost (boost) mode and a buck (buck) mode to adjust an output voltage, and provide the output voltage to another module of the electronic device. For ease of description, FIG. 2 only shows that the voltage buck-boost adjustment circuit 12 provides a voltage to the NFC module 16 as an example, and other modules shown in FIG. 1a are omitted herein.

In addition, in some other implementations, the voltage buck-boost adjustment circuit 12 may optionally or alternatively implement some functions of the voltage buck-boost converter 122 in this application by using another voltage adjustment circuit such as a boost-bypass (Boost-Bypass) circuit. The voltage buck-boost converter in this application is merely used as an example, but not a specific limitation in this application.

The feedback voltage adjustment circuit 124 is configured to adjust a feedback voltage output by the feedback voltage output port (FB) of the voltage buck-boost converter 122, so that an output voltage reaches a predetermined voltage value.

An input port of the switch circuit 126b is coupled to an NFC enable signal and a control circuit 14, and an output port of the switch circuit 126b is coupled to an enable port (EN) of the voltage buck-boost converter 122. The NFC enable signal shown in FIG. 2 is the same as the NFC enable signal shown in FIG. 1a. Details are not described herein again. An input port of the switch circuit 126a is coupled to the PMU included in the power supply 10, so as to receive a PMU enable signal. An output port of the switch circuit 126a is coupled to the enable port (EN) of the voltage buck-boost converter 122. The switch circuit 126 is generally a protection circuit. In an example, the switch circuit 126b is configured to keep open when the PMU enable signal is a high-level input enable port (EN), so as to prevent the PMU enable signal from being input to the control circuit 14 and the NFC module 16, and prevent the NFC enable signal from being input to the enable port (EN). The switch circuit 126a is configured to keep open when a high-level NFC enable signal is input to the enable port (EN), so as to prevent the NFC enable signal from being input to the power supply 10. In some implementations, the switch circuit 126 may be a bipolar junction transistor (Bipolar Junction Transistor, BJT), an insulated gate bipolar transistor (Insulated Gate Bipolar Transistor, IGBT domain-like transistor), or the like. In this case, the switch circuit 126 may be opened or closed based on voltage values of the NFC enable signal and the PMU enable signal. For example, the switch circuit 126b is configured to be turned on when the voltage value of the NFC enable signal is greater than the voltage value of the PMU enable signal, so that the NFC enable signal is input to the enable port (EN) of the voltage buck-boost converter 122, so as to enable the voltage buck-boost converter 122; and the switch circuit 126b is further configured to be turned off when the voltage value of the PMU enable signal is greater than the voltage value of the NFC enable signal, so that the PMU enable signal cannot be input to the control circuit 14. The switch circuit 126a is configured to be turned on when the voltage value of the PMU enable signal is greater than the voltage value of the NFC enable signal, so that the PMU enable signal is input to the enable port (EN) of the voltage buck-boost converter 122, so as to enable the voltage buck-boost converter 122; and the switch circuit 126a is further configured to be turned off when the voltage value of the PMU enable signal is less than the voltage value of the NFC enable signal, so that the NFC enable signal cannot be input into the PMU.

The control circuit 14 receives the NFC enable signal, and is coupled to the voltage buck-boost adjustment circuit 12. The control circuit 14 is coupled to the feedback voltage output port (FB), and controls, by adjusting a current of a branch in which the control circuit 14 is located, an output voltage of a voltage output port (VOUT) of the voltage buck-boost adjustment circuit 12. As an example, when the NFC enable signal is at a high level, the control circuit 14 closes a circuit between the feedback voltage output port (FB) and the control circuit 14, so that an output voltage of the feedback voltage output port (FB) may be loaded into the branch in which the control circuit 14 is located, so as to generate, in the branch in which the control circuit 14 is located, a branch current that flows through the control circuit 14 and flows to the ground, so as to adjust the current that flows through the feedback voltage adjustment circuit 124, and then control the voltage output port (VOUT) of the output port (VOUT) of the voltage buck-boost adjustment circuit 12 to output a first voltage. The first voltage may meet a requirement of a module that needs to be driven by a high voltage, such as the NFC module 16, so that the NFC module 16 can perform an NFC function. The NFC module 16 is similar to the NFC module shown in FIG. 1a, and details are not described herein again. In the illustrated implementation, the NFC module 16 is only an example of an electronic component that needs to be driven by a relatively high voltage in some scenarios in the electronic device 1.

In another example, when the NFC enable signal is at a low level, the control circuit 14 opens a circuit between the feedback voltage output port (FB) and the control circuit 14, so that a tributary in which the control circuit 14 is located does not generate a tributary current flowing through the control circuit 14 to the ground, and therefore a current flowing through the feedback voltage adjustment circuit 124 is not changed, so that a voltage output port (VOUT) of the voltage buck-boost adjustment circuit 12 outputs a second voltage or a zero voltage. For example, when the NFC enable signal is at a low level and the PMU enable signal is at a high level, the voltage output port (VOUT) outputs a second voltage; and when the NFC enable signal is at a low level and the PMU enable signal is also at a low level, that is, the enable port (EN) of the voltage buck-boost converter 122 does not receive a high-level enable signal, the voltage buck-boost converter 122 does not operate, and the voltage output port (VOUT) outputs a zero voltage. The following further describes the implementation with reference to FIG. 3 and a scenario.

The second voltage is lower than the first voltage, and the second voltage may be an output voltage of the voltage buck-boost converter described in FIG. 1a, that is, the second voltage may be used to drive many modules of the electronic device such as a power management unit or a power management circuit, a linear regulator, a phase detector, a transmitting module, a power amplifier, a low noise amplifier, a Wi-Fi front-end module, and a 5G front-end module.

It may be understood that, in this implementation of this application, the high level and the low level are set so that the one or more circuits shown in FIG. 2 perform an expected function. Therefore, the high level and the low level may be preset voltage values, for example, the high level is 1.8 V, and the low level is ground or 0 V. Alternatively, the high level may be a voltage value equal to or higher than a predetermined threshold, the low level may be a voltage value equal to or lower than a predetermined threshold, the predetermined threshold of the high level is greater than the predetermined threshold of the low level, for example, the predetermined threshold of the high level may be 1.5 V, and the predetermined threshold of the low level may be 0.5 V.

According to the implementation shown in FIG. 2, when the electronic device 1 is powered on, the power supply 10 provides an input voltage to the voltage buck-boost adjustment circuit 12, and the PMU enable signal is at a high level and enables the voltage buck-boost converter 122, so that the voltage buck-boost converter 122 operates.

Based on the foregoing case, in a scenario in which the NFC module 16 does not operate, for example, when the NFC module disables a polling (Polling) or listening (Listening) function, that is, when the NFC module neither transmit an electromagnetic wave outward to initiate NFC communication nor receive an electromagnetic wave in response to NFC communication initiated by another device, the NFC enable signal is at a low level, so that the control circuit 14 controls the output voltage of the voltage output port (VOUT) of the voltage buck-boost adjustment circuit 12 to be the second voltage such as 3.4 V. In a scenario in which the NFC module 16 needs to operate, for example, when the NFC module 16 initiates polling or is listening, the NFC module 16 needs to send an electromagnetic wave used for NFC communication or receive an electromagnetic wave used for NFC communication that is sent by another device. In this case, the NFC enable signal is at a high level, so that the control circuit 14 controls the output voltage of the voltage output port (VOUT) of the voltage buck-boost adjustment circuit 12 to be the first voltage used to drive the NFC module 16. After receiving the first voltage, the NFC module 16 performs the NFC function.

In some implementations, the NFC module 16 may operate when the electronic device 1 is powered off. Therefore, after the electronic device 1 is powered off, the power supply 10 may provide an input voltage to the voltage buck-boost adjustment circuit 12 when the voltage buck-boost adjustment circuit 12 is enabled. However, because the PMU is powered off, the voltage of the PMU enable signal is 0 V, the voltage buck-boost converter 122 does not operate, and the output voltage of the voltage buck-boost adjustment circuit 12 is 0 V. Based on the foregoing case, in the scenario in which the NFC module 16 does not operate, the NFC enable signal is at a low level. Therefore, the voltage buck-boost converter 122 does not operate, and the output voltage of the voltage output port (VOUT) of the voltage buck-boost circuit 12 is 0 V. In contrast, in the scenario in which the NFC module 16 needs to operate, the NFC enable signal is at a high level, the voltage buck-boost converter 122 is enabled, and the control circuit 14 controls the output voltage of the voltage output port (VOUT) of the voltage buck-boost circuit 12 to be the first voltage used to drive the NFC module 16. After receiving the first voltage, the NFC module 16 performs the NFC function.

In addition, the polling operation of the NFC module 16 is generally performed only when the electronic device is awakened by the user. For example, when the user unlocks a screen of the electronic device and operates an application related to the NFC function, the NFC module 16 may perform a polling operation in response to some actions of the user on the NFC application of the electronic device, and an operation mode of the NFC module 16 may be operating at an interval of a specific time. For example, the NFC module 16 may enable the voltage buck-boost adjustment circuit 12 for 60 ms once every 500 ms. Therefore, the power supply circuit of this application has little impact on overall power consumption of the electronic device 1.

Therefore, with reference to the implementation described in FIG. 2, the boost circuit in the existing technology is omitted. Therefore, when no additional boost circuit needs to be used, an input voltage required for operation may be provided for a module that needs to be driven by a high voltage, such as an NFC module, so that a circuit area occupied by the boost circuit may be released to the electronic device.

Figure 3:
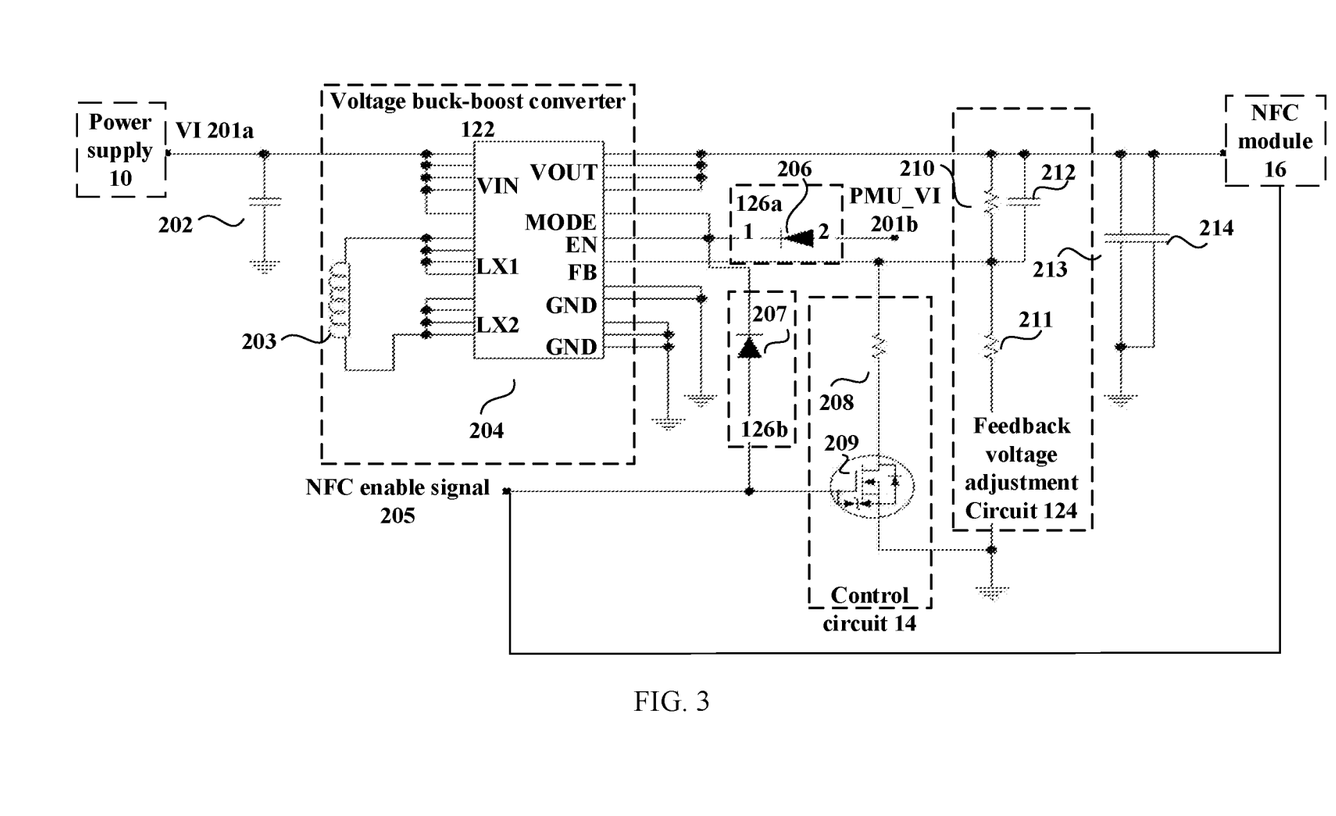
FIG. 3 is a simplified schematic circuit diagram of a part of a power supply circuit shown in FIG. 2.

FIG. 3 is a simplified schematic circuit diagram of a part of a power supply circuit shown in FIG. 1b, which may be used to implement some implementations of this application. The power supply circuit shown in FIG. 3 is shown in a simplified form in which many details that are not relevant to a complete understanding of the present invention.

FIG. 3 shows only some ports in the voltage buck-boost converter 204, and a plurality of ports with similar functions are only briefly labeled. For example, the voltage buck-boost converter 204 may include a voltage input port VIN, a voltage output port VOUT, an inductance input port LX1, an inductance output port LX2, a mode port MODE, an enable port EN, a feedback voltage output port FB, and a ground port GND, where the ground port GND is used for grounding. The voltage buck-boost converter 204 may be any voltage buck-boost converter available to a person skilled in the art, such as ISL91110 series voltage buck-boost converters from Renesas Electronics Corporation.

Specifically, by using an input line between the power supply 10 and the voltage buck-boost converter 204, an input voltage VI201a from the power supply 10 is loaded to the voltage input port VIN of the voltage buck-boost converter 204, and a grounded input capacitor 202 is coupled to the input line, where the input capacitor 202 is configured to stably load the input voltage VI201a of the voltage input port VIN of the voltage buck-boost converter 204. An inductor 203 is coupled between the inductance input port LX1 and the inductance output port LX2 of the voltage buck-boost converter 204. The inductor 203 is configured to store energy for the voltage buck-boost converter 204 when the voltage buck-boost converter 204 is operating, and provide a relatively constant inductance current to the voltage buck-boost converter 204. The output port VOUT of the voltage buck-boost converter 204 generates the output voltage VO of the voltage buck-boost converter 204. The mode port MODE of the voltage buck-boost converter 204 is a logical input port. By inputting a high voltage level signal and a low voltage level signal to the MODE port, the voltage buck-boost converter 204 can operate in different modes such as a width modulation (Pulse Width Modulation, PWM) mode and a pulse frequency modulation (Pulse Frequency Modulation, PFM) mode. In this application, the voltage buck-boost converter 204 may operate in any mode, which is not specifically limited herein.

The enable port EN of the voltage buck-boost converter 204 receives the NFC enable signal 205 and the PMU enable signal PMU_VI201b, respectively. More specifically, a port (not shown) that is of the NFC module 16 and that outputs the NFC enable signal 205 is coupled to a positive electrode of a diode 207, and the negative electrode of the diode 207 is coupled to both the enable port EN and the mode port MODE of the voltage buck-boost converter 204. In addition, a port (not shown) that is of the PMU and that outputs the PMU enable signal PMU_VI 201b is coupled to a positive electrode of a diode 206, and the negative electrode of the diode 206 is coupled to both the enable port EN and the mode port MODE of the voltage buck-boost converter 204. It may be understood that the reverse breakdown voltages of the diodes 206 and 207 are greater than voltage values that can be output by the PMU enable signal PMU_VI 201*b* and the NFC enable signal 205, so that the diodes 206 and 207 protect the circuit.

The feedback voltage output port FB of the voltage buck-boost converter 204 outputs a feedback voltage VFB. The feedback voltage output port FB is coupled to both the control circuit 14 and the feedback voltage adjustment circuit 124. Specifically, the control circuit 14 includes a resistor 208 and an electronic switch 209. In FIG. 3, the electronic switch 209 is shown as a variant of an N-channel enhanced MOS-FET, for example, a high-power N-channel enhanced MOS-FET with two Zener diodes in reverse series between a gate and a source. It may be understood that the electronic switch 209 may include a MOS (Metal-Oxide Semiconductor, Metal-Oxide Semiconductor) or FET (Field Effect Transistor, Field Effect Transistor) type transistor, such as a P-type MOS (PMOS) or P-type FET (PFET) transistor, an N-type MOS (NMOS) or P-type FET (PFET) transistor, or a MOS-FET transistor. An alternative power switch apparatus or electronic control switch such as a bipolar junction transistor (Bipolar Junction Transistor, BJT), an insulated gate bipolar transistor (Insulated Gate Bipolar Transistor, IGBT), and a similar transistor are also expected. A size and a configuration of the switch circuit are set to perform an expected function.

The feedback voltage output port FB is coupled to one end of the resistor 208; the other end of the resistor 208 is coupled to a drain port of the electronic switch 209; a gate port of the electronic switch 209 is coupled to a port that is of the NFC module 16 and that outputs the NFC enable signal 205; and a source port of the electronic switch 209 and the feedback voltage adjustment circuit 124 are jointly grounded. The feedback voltage adjustment circuit 124 includes a resistor 210, a resistor 211, and a capacitor 212. One end of the resistor 210 and one end of the capacitor 212 are jointly coupled to the output port VOUT of the voltage buck-boost converter 204; the other end of the resistor 210 and the other end of the capacitor 212 are jointly coupled to the feedback voltage output port FB and one end of the resistor 211; and the other end of the resistor 211 and the source port of the electronic switch 209 are jointly grounded. In other words, the resistor 210 and the capacitor 212 are connected in parallel between the output port VOUT and the feedback voltage output port FB, and the capacitor 212 is configured to absorb an overvoltage in a spike state at both ends of the resistor 210. The resistor 210 and the resistor 211 are connected in parallel to the feedback voltage output port FB, and the resistor 208 is connected in series to the electronic switch 209 and then connected in parallel with the resistor 211 b etween the feedback voltage output port FB and the ground.

Capacitors 213 and 214 are connected in parallel between the output port VOUT and the ground, and capacitors 213 and 214 are configured to regulate the output voltage that passes through the over-feedback voltage adjustment circuit 124.

The following describes the technical solutions of this application in detail with reference to the circuit structure shown in FIG. 3.

In some examples, when the electronic device 1 is powered on, the power supply 10 may provide the voltage buck-boost converter 204 with an input voltage VI 201*a* of about 2.5-4.5 V, the PMU may provide a 1.8 V PMU enable signal PMU_VI 201*b*, and the diode 206 is forward turned on, so as to enable the voltage buck-boost converter 204 is enabled, so that the voltage buck-boost converter 204 operates.

Based on the foregoing case, in a scenario in which the NFC module 16 does not operate, the NFC enable signal is at a low level, for example, a zero voltage value. In this case, the voltage of the positive electrode of the diode 207 is zero, the voltage of the negative electrode of the diode 207 is 1.8 V, and the diode 207 is backward turned off, so that the PMU enable signal does not pass through the diode 207 to drive the electronic switch 209, which protects the control circuit 14, and prevents the PMU enable signal from driving the control circuit 14. Therefore, the input voltage of the gate port of the electronic switch 209 is zero, the gate of the electronic switch 209 is not driven, and the electronic switch 209 is disconnected, so that the feedback voltage VFB of the feedback voltage output port FB is not applied to the resistor 208.

In this case, the voltage value of the output voltage VO of the output port VOUT of the voltage buck-boost converter 204 may be determined by the feedback voltage VFB of the feedback voltage output port FB and the resistance values of the resistor 210 and the resistor 211, and the voltage value of the output voltage VO of the output port VOUT may be adjusted by adjusting the resistance values of the resistor 210 and the resistor 211. For example, assuming that the resistance value of the resistor 210 is R1 and the resistance value of the resistor 211 is R2, the output voltage VO is:

$$VO = VFB \times \left(\frac{R1}{R2} + 1\right)$$

The feedback output voltage VFB of the feedback voltage output port FB may be generally set to 0.8 V. Therefore, a required output voltage VO may be obtained by adjusting a ratio of the resistance value of the resistor 210 to the resistance value of the resistor 211. As an example, when the resistance value R1 of the resistor 210 is 121 kilohms and the resistance value R2 of the resistor 211 is 37.4 kilohms, the ratio of R1/R2 is 3.2, and an approximate value of the output voltage VO is 3.38 V.

Figure 4:
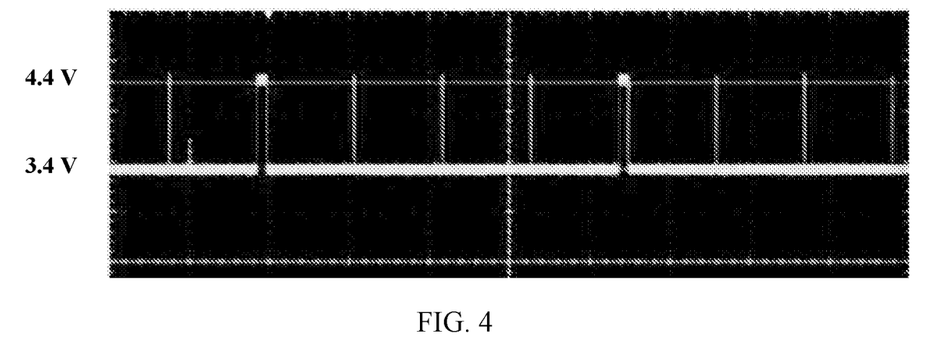

FIG. 4 is a schematic diagram illustrating an output voltage change of the foregoing power supply circuit when the electronic device 1 is powered on. As shown in FIG. 4, when the NFC enable signal is at a low level, the output voltage VO of the output port VOUT of the voltage buck-boost converter 204 is basically stably maintained at about 3.4 V through measurement by using an oscilloscope.

Returning to FIG. 3, in a scenario in which the NFC module 16 needs to operate, the NFC enable signal 205 output by the NFC module 16 is at a high level, for example, 1.8 V. After the electronic device 1 is powered on, the PMU may provide the PMU enable signal PMU_VI201*b* to enable the voltage buck-boost converter 204, so that the voltage buck-boost converter 204 operates. In this case, the PMU enable signal is input to a negative port of the diode 207. In this case, the NFC enable signal 205 is input to both a positive port of the diode 207 and a gate port of the electronic switch 209. After the NFC enable signal is input to the positive port of the diode 207, the diode 207 may be turned on or off based on a voltage value of the PMU enable signal PMU_VI 201*b* that is input to the negative port of the diode 207 earlier than the NFC enable signal. For example, assuming that the voltage value of the PMU_VI 201*b* is 1.8 V as described above, a voltage difference between the positive electrode and the negative electrode of the diode 207 is zero, which is less than a dead-time voltage of the diode 207. Therefore, the diode 207 is forward turned off, and the voltage buck-boost converter 204 is enabled by the PMU enable signal PMU_VI201b. Assuming that a difference between the voltage value of the NFC enable signal 205 and the voltage value of the PMU_VI201b is greater than a dead-time voltage value of the diode 207, the diode 207 is forward turned on, and the diode 206 is backward turned off, so that the voltage buck-boost converter 204 is enabled by the NFC enable signal 205.

After the NFC enable signal is input to the gate port of the electronic switch 209, the electronic switch 209 may be driven, and the electronic switch 209 is turned on, where the NFC enable signal may remain at a high level, so as to keep the electronic switch 209 turned on. When the electronic switch 209 is turned on, because the feedback output voltage VFB of the feedback voltage output port FB is loaded on one end of the resistor 208, the source port of the electronic switch 209 is grounded, and a current may flow from the feedback voltage output port FB to the resistor 208, and then flow from the drain port of the electronic switch 209 to the ground. In this case, because the resistor 208 and the electronic switch 209 are connected in series and then connected in parallel to the resistor 211, a current flowing through the feedback voltage adjustment circuit 124 increases, thereby increasing the output voltage VO of the output port VOUT of the voltage buck-boost converter 204.

As an example, when the resistance value R3 of the resistor 208 is large enough, the electronic switch 209 may be considered as a switch apparatus in an ideal state. Therefore, the output voltage VO of the output port VOUT of the voltage buck-boost converter 204 is:

$$VO = VFB \times \left( \frac{R1}{R2 \| R3} + 1 \right)$$

Assuming that the feedback output voltage VFB of the feedback voltage output port FB is set to 0.8 V, when a resistance value R1 of the resistor 210 is 121 kilohms, the resistance value R2 of the resistor 211 is 37.4 kilohms, and the resistance value R3 of the resistor 208 is 90.9 kilohms, a ratio of R1/(R2∥R3) is 4.5, and an approximate value of the output voltage VO of the output port VOUT is 4.4V. The output voltage VO is greater than a minimum drive voltage of the NFC module 16, and therefore the output voltage VO may drive the NFC module 16 to operate. In some other implementations, the voltage value of the output voltage VO of the output port VOUT may be any other voltage value that is greater than the minimum drive voltage 4 V of the NFC module 16, for example, 4.5 V and 5 V, which is merely an example in this application, but not a specific limitation on the output voltage VO.

Referring to FIG. 4, when the NFC enable signal 205 output by the NFC module 16 is at a high level, the output voltage VO of the output port VOUT of the voltage buck-boost converter 204 increases to about 4.4 V. Because the NFC module 16 may enable the voltage buck-boost adjustment circuit 12 for a short time (for example, 60 ms) at a fixed period, a time in which the output voltage VO of the output port VOUT is maintained at about 4.4 V is short relative to a time in which the output voltage VO is maintained at about 3.4 V. Therefore, the power supply circuit in this application has little impact on overall power consumption of the electronic device 1. Referring to FIG. 3, the resistance values used by the resistors 208, 210, and 211 are merely example values. It may be understood that, in a possible case, the respective resistance values of the resistors 208, 210, and 211 may be adjusted, so that a ratio of R1/(R2/R3) is 4.5, so as to obtain an output voltage VO of 4.4 V. In some other possible cases, the required specific ratios may also be obtained by adjusting the respective resistance values of the resistors 208, 210 and 211 to finally obtain the specific output voltage VO of the output port VOUT.

In some other implementations, when the electronic device 1 is powered off, the power supply 10 may still provide the voltage buck-boost converter 204 with an input voltage VI 201a from 2.5 V to 4.5 V. However, because the PMU is powered off, the voltage of the PMU enable signal PMU_VI 201b is 0 V. Therefore, the voltage buck-boost converter 204 does not operate, and the output voltage VO of the voltage output port VOUT of the voltage buck-boost converter 204 is 0 V.

Based on the foregoing case, in a scenario in which the NFC module 16 does not operate, the NFC module 16 does not output the NFC enable signal 205. Therefore, the enable port EN of the voltage buck-boost converter 204 does not have an input level, the voltage buck-boost converter 204 does not operate, and the output voltage VO of the voltage output port VOUT of the voltage buck-boost converter 204 remains at 0 V. In a scenario in which the NFC module 16 needs to operate, the NFC module 16 can output a high-level NFC enable signal 205, for example, 1.8 V, even when the electronic device 1 is powered off. In this case, because the voltage of the PMU enable signal PMU_VI 201b is 0 V, the diode 207 is forward turned on, the diode 206 is backward turned off, and the NFC enable signal 205 enables the voltage buck-boost converter 204 and the voltage buck-boost converter 204 to operate. It may be learned from the foregoing detailed descriptions that when the NFC enable signal 205 is a high-level voltage, the output voltage VO of the voltage buck-boost converter 204 is 4.4 V, and the output voltage VO drives the NFC module 16 to operate.

According to various implementations of this application, a boost circuit in the existing technology is omitted. Therefore, when no additional boost circuit is needed, an input voltage required for operation may be provided for a module that needs to be driven by a high voltage, such as an NFC module, so that a circuit area occupied by the boost circuit may be released for the electronic device.

Figure 5:
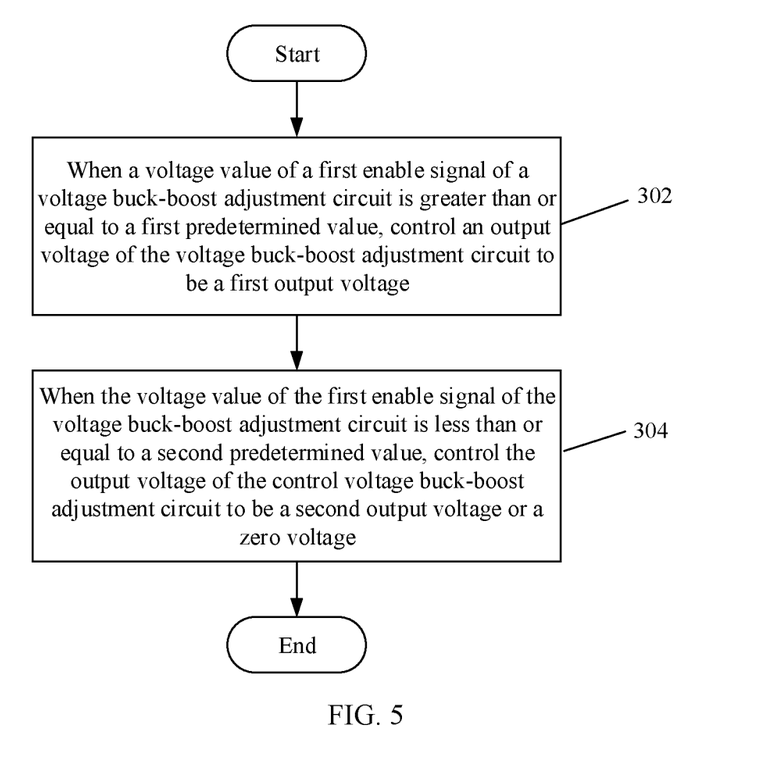
FIG. 5 is a flowchart of a method for a control circuit that can be used to control a part of a power supply circuit of an electronic device according to an implementation of this application.

FIG. 5 is a flowchart of a method 300 for a control circuit 14 that is used to control a part of a power supply circuit of an electronic device 1 according to an implementation of this application.

In some implementations, the method 300 may be used to implement the conversion of the output voltage of the voltage buck-boost adjustment circuit 12 described in FIG. 2 and FIG. 3. For the content not described in the foregoing circuit implementations, reference may be made to the following method implementation. Similarly, for the content not described in the method implementation, reference may be made to the foregoing circuit implementations.

Specifically, in 302, the control circuit 14 controls the output voltage of the voltage buck-boost adjustment circuit 12 to be a first output voltage when the voltage value of the first enable signal of the voltage buck-boost adjustment circuit 12 is greater than or equal to a first predetermined value.

304. When the voltage value of the first enable signal of the voltage buck-boost adjustment circuit 12 is less than or equal to a second predetermined value, the control circuit 14 controls the voltage buck-boost adjustment circuit 12 to output a second output voltage or a zero voltage. The first predetermined value is greater than the second predetermined value, and the first output voltage is higher than the second output voltage.

In some implementations, optionally or additionally, in 304, when the voltage value of the first enable signal is less than or equal to the second predetermined value and the voltage value of the second enable signal of the voltage buck-boost adjustment circuit 12 is greater than zero, the control circuit 14 may further control the voltage of the voltage buck-boost adjustment circuit 12 to be the second output voltage.

In some other implementations, optionally or additionally, in 304, when the voltage value of the first enable signal is less than or equal to the second predetermined value and the voltage value of the second enable signal of the voltage buck-boost adjustment circuit 12 is equal to zero, the control circuit 14 may further control the output voltage of the voltage buck-boost adjustment circuit to be a zero voltage.

Further, the first enable signal is a voltage signal from the NFC module 16, and the first enable signal is further used to enable an enable port of the voltage buck-boost adjustment circuit 12.

Further, the second enable signal is a voltage signal from the PMU (PMU), and the second enable signal is used to enable an enable port of the voltage buck-boost adjustment circuit 12.

In some implementations, the first output voltage and/or the second output voltage are/is used to supply power to the NFC module 16.

According to the implementations of this application, when no additional boost circuit is needed, an input voltage required for operation may be provided for a module that needs to be driven by a high voltage, such as an NFC module, so that a circuit area occupied by the boost circuit may be released to the electronic device.

Unless otherwise specified in the context, the terms "including", "having", and "comprising" are synonyms. The phrase "A/B" means "A or B". The phrase "A and/or B" means "(A and B) or (A or B)".

In the accompanying drawings, some structural or method features are shown in a specific arrangement and/or order. However, it should be understood that such a specific arrangement and/or ordering may not be required. In some embodiments, these features may be arranged in a manner and/or order different from as shown in the illustrative accompanying drawings. In addition, the inclusion of structural or methodological features in a particular figure does not mean implying that such features are required in all embodiments, and in some embodiments, these features may not be included or may be combined with other features.

It should be understood that although the terms "first", "second", and the like may be used herein to describe various units or data, these units or data should not be limited by these terms. These terms are used only to distinguish one feature from another. For example, without departing from the scope of example embodiments, a first feature may be referred to as a second feature, and similarly the second feature may be referred to as the first feature.

What is claimed is:

1. A power supply circuit, comprising:
    a voltage buck-boost adjustment circuit, configured to switch, based on an input voltage, between a boost mode and a buck mode to adjust an output voltage;
    a control circuit coupled to the voltage buck-boost adjustment circuit, the control circuit configured to:
        control the output voltage of the voltage buck-boost adjustment circuit to be a first output voltage when a voltage of a first enable signal of the voltage buck-boost adjustment circuit is greater than or equal to a first predetermined value; and
        control the output voltage of the voltage buck-boost adjustment circuit to be a second output voltage or a zero voltage when the voltage of the first enable signal of the voltage buck-boost adjustment circuit is less than or equal to a second predetermined value, wherein the first predetermined value is greater than the second predetermined value, and wherein the first output voltage is greater than the second output voltage;
    a first switch circuit, configured to:
        turn on to provide the first enable signal as an input to an enable port of the voltage buck-boost adjustment circuit when the voltage of the first enable signal is greater than a voltage of a second enable signal of the voltage buck-boost adjustment circuit; and
        turn off to prevent the second enable signal from being provided to the control circuit when the voltage of the first enable signal is less than the voltage of the second enable signal; and
    a second switch circuit, configured to:
        turn on to provide the second enable signal as an input to the enable port of the voltage buck-boost adjustment circuit when the voltage of the second enable signal is greater than the voltage of the first enable signal; and
        turn off to prevent the first enable signal from being provided to a generation module of the second enable signal when the voltage of the second enable signal is less than the voltage of the first enable signal.

2. The power supply circuit of claim 1, wherein the control circuit comprises:
    a first resistor; and
    a third switch circuit coupled to the first resistor, wherein the third switch circuit is configured to:
        turn on when the voltage of the first enable signal is greater than or equal to the first predetermined value; and
        turn off when the voltage of the first enable signal is less than or equal to the second predetermined value.

3. The power supply circuit of claim 2, wherein the voltage buck-boost adjustment circuit further comprises:
    a feedback voltage port; and
    a feedback voltage adjustment circuit configured to adjust the output voltage of the voltage buck-boost adjustment circuit based on a feedback voltage provided by the feedback voltage port,
    wherein the third switch circuit is configured to selectively couple the first resistor of the control circuit to the feedback voltage adjustment circuit,
    wherein the coupling between the first resistor and the feedback voltage adjustment circuit is enabled when the third switch circuit is turned on, and
    wherein the coupling between the first resistor and the feedback voltage adjustment circuit is disabled when the third switch circuit is turned off.

4. The power supply circuit of claim 3, wherein the first resistor is configured to increase a total current of the feedback voltage adjustment circuit when the voltage of the first enable signal is greater than or equal to the first predetermined value.

5. The power supply circuit of claim 3, wherein a first port of the third switch circuit receives the first enable signal, wherein a second port of the third switch circuit is coupled to one end of the feedback voltage adjustment circuit and is grounded, wherein a third port of the third switch circuit is coupled to one end of the first resistor, and wherein the other end of the first resistor is coupled to the feedback voltage port.

6. The power supply circuit of claim 1, wherein the control circuit is further configured to control the output voltage of the voltage buck-boost adjustment circuit to be the second output voltage when the voltage of the first enable signal is less than or equal to the second predetermined value and a voltage of a second enable signal of the voltage buck-boost adjustment circuit is greater than zero.

7. The power supply circuit of claim 1, wherein when the voltage of the first enable signal is less than or equal to the second predetermined value and a voltage of a second enable signal of the voltage buck-boost adjustment circuit is equal to zero, the output voltage of the voltage buck-boost adjustment circuit is a zero voltage.

8. The power supply circuit of claim 5, wherein the feedback voltage adjustment circuit comprises a second resistor and a third resistor, wherein one end of the second resistor is coupled to the second port of the third switch circuit and is grounded, wherein the other end of the second resistor is coupled to one end of the third resistor and is coupled to the feedback voltage port, and wherein the other end of the third resistor is coupled to an output port configured to provide the output voltage of the voltage buck-boost adjustment circuit.

9. The power supply circuit of claim 2, wherein the third switch circuit is a transistor.

10. The power supply circuit of claim 2, wherein the third switch circuit comprises an insulated field effect transistor.

11. The power supply circuit of claim 1, wherein the first switch circuit is a diode that includes a positive electrode that receives the first enable signal, and a negative electrode that is coupled to the enable port; and
wherein the second switch circuit is a diode that includes a positive electrode that receives the second enable signal, and a negative electrode that is coupled to the enable port.

12. The power supply circuit of claim 1, wherein the first enable signal is a voltage signal from a near field communication (NFC) module.

13. The power supply circuit of claim 1, wherein the second enable signal is a voltage signal from a power management unit.

14. The power supply circuit of claim 1, wherein a signal of the first output voltage and/or a signal of the second output voltage are/is used to drive a near field communication (NFC) module.

15. A method of controlling a voltage buck-boost adjustment circuit with a control circuit, the method comprising:
controlling an output voltage of the voltage buck-boost adjustment circuit to be a first output voltage when a voltage of a first enable signal of the voltage buck-boost adjustment circuit is greater than or equal to a first predetermined value; and
controlling the output voltage of the voltage buck-boost adjustment circuit to be a second output voltage or a zero voltage when the voltage of the first enable signal is less than or equal to a second predetermined value and a voltage of a second enable signal of the voltage buck-boost adjustment circuit is greater than zero,
wherein the first predetermined value is greater than the second predetermined value, and
wherein the first output voltage is greater than the second output voltage.

16. The method of claim 15, further comprising:
providing the first enable signal as an input to an enable port of the voltage buck-boost adjustment circuit when the voltage of the first enable signal is greater than a voltage of a second enable signal of the voltage buck-boost adjustment circuit;
preventing the second enable signal from being provided to the control circuit when the voltage of the first enable signal is less than the voltage of the second enable signal;
providing the second enable signal as an input to the enable port of the voltage buck-boost adjustment circuit when the voltage of the second enable signal is greater than the voltage of the first enable signal; and
preventing the first enable signal from being provided to a generation module of the second enable signal when the voltage of the second enable signal is less than the voltage of the first enable signal.

17. A method of controlling a voltage buck-boost adjustment circuit with a control circuit, the method comprising:
controlling an output voltage of the voltage buck-boost adjustment circuit to be a first output voltage when a voltage of a first enable signal of the voltage buck-boost adjustment circuit is greater than or equal to a first predetermined value; and
controlling the output voltage of the voltage buck-boost adjustment circuit to be a second output voltage or a zero voltage when the voltage of the first enable signal is less than or equal to a second predetermined value,
wherein the first predetermined value is greater than the second predetermined value,
wherein the first output voltage is greater than the second output voltage, and
wherein when the voltage of the first enable signal is less than or equal to the second predetermined value and a voltage of a second enable signal of the voltage buck-boost adjustment circuit is equal to zero, the output voltage of the voltage buck-boost adjustment circuit is a zero voltage.

18. The method of claim 15, further comprising receiving the first enable signal from a near field communication (NFC) module.

19. The method of claim 17, further comprising receiving the first enable signal from a near field communication (NFC) module.

20. The method of claim 17, further comprising:
providing the first enable signal as an input to an enable port of the voltage buck-boost adjustment circuit when the voltage of the first enable signal is greater than a voltage of a second enable signal of the voltage buck-boost adjustment circuit;
preventing the second enable signal from being provided to the control circuit when the voltage of the first enable signal is less than the voltage of the second enable signal;
providing the second enable signal as an input to the enable port of the voltage buck-boost adjustment circuit when the voltage of the second enable signal is greater than the voltage of the first enable signal; and
preventing the first enable signal from being provided to a generation module of the second enable signal when the voltage of the second enable signal is less than the voltage of the first enable signal.

\* \* \* \* \*